United States Patent [19]

Arus et al.

[11] Patent Number: 5,503,949
[45] Date of Patent: Apr. 2, 1996

[54] PLATE BLOCK FOR LEAD BATTERIES

[75] Inventors: Jose Arus, Barcelona, Spain; Gerald Böke; Herbert Koss, both of Hildesheim, Germany

[73] Assignee: Varta Batterie Aktiengesellschaft, Hannover, Germany

[21] Appl. No.: 307,380

[22] Filed: Sep. 16, 1994

[30] Foreign Application Priority Data

Sep. 16, 1993 [DE] Germany ............................ 43 31 446.5

[51] Int. Cl.$^6$ .............................. H01M 4/24; H01M 4/16; H01M 4/22
[52] U.S. Cl. ............................ 429/211; 429/160; 429/161; 29/731
[58] Field of Search .................... 429/211, 159, 429/160, 161; 29/731

[56] References Cited

U.S. PATENT DOCUMENTS 4,160,071  7/1979  Parker ..................... 429/211
4,782,585  11/1988  Kobayashi et al. .............. 29/623.5
5,308,719  5/1994  Mrotek et al. ..................... 429/171

FOREIGN PATENT DOCUMENTS 3620891  12/1987  Germany.

Primary Examiner—Prince Willis, Jr.
Assistant Examiner—Richard H. Lilley, Jr.
Attorney, Agent, or Firm—Weiser & Associates

[57] ABSTRACT

In a plate block for lead batteries having plates of one polarity with plate lugs which are thicker than the plate lugs of the plates of the other polarity, an equalization of the volumes and of the areas of the two lug types is achieved by providing the thicker lugs with a wedge-like taper toward their end, so that the end thickness of the tapered lugs is less than that of the thinner lugs, which are left in their original shape (i.e., an essentially rectangular cross-section). As a result, the heat applied to the two lug types is balanced during casting on of the pole bridges in similar casting molds and at the same lead temperature. The wedge-like geometry is imparted to the thicker lugs by machining them with a face milling tool.

11 Claims, 1 Drawing Sheet

PLATE BLOCK FOR LEAD BATTERIES

BACKGROUND OF THE INVENTION

The present invention generally relates to the manufacture of plate blocks for lead batteries which are comprised of a plurality of positive and negative plates provided with plate lugs which are interconnected by bridges (pole straps) cast around the plate lugs in a casting mold.

The combination of plates to form a plate block is ordinarily accomplished by stacking positive and negative grid plates in an alternating sequence, with separators placed between them, so that the lug conductors of the positive plates and the lug conductors of the negative plates are positioned on top of, and along opposite sides of the resulting stack. The assembled plate block is then inverted so that the lugs hang downwardly, for immersion in casting molds which face toward the plate block. The casting molds are filled with molten lead for forming the pole bridges which are to connect the plates of the same polarity. As a result, the lugs are fused onto and are thus connected to the cast lead mass which, after hardening, forms the pole bridges of the plate block. The casting molds are arranged at a fixed distance from one another so that both bridges can be cast simultaneously.

In practice, it has been found that these operations can result in poor connections between the plate lugs and the cast-on bridges. A poor connection can break when the battery is used, or can exhibit excessive electrical resistance. It has been found that this results from the thin oxide layer which conventionally covers the lug surfaces, and which represents an obstacle to coalescence of the poured-in lead and the (heated) lead forming the plate lugs. For this reason, the plate lugs are frequently immersed in a flux solution before casting in order to remove the surface oxides and improve the contact which results.

The overall conditions important for a good cast-on operation include good heat transfer balanced with energy (heat) economy. On the one hand, the heat carried away from the lead melt (e.g., by the lugs) should not be too great. Otherwise, hardening of the lead melt will take place too rapidly. On the other hand, additional heating of the lead melt is to be avoided for reasons of economy. Efforts have been made to optimize this process, but have not been entirely satisfactory.

For example, U.S. Pat. No. 4,160,071 discloses plate lugs which, instead of having the normally rectangular cross-section, are reduced to a wedge-shape toward their outer end. By this shaping, not only is the mass of the lug kept to a minimum, but unnecessary heating (and the resulting cost) is prevented. However, because of this shaping, and due to the wettability of molten lead, the molten lead (despite a low immersion depth) tends to rise on the wedge profile, forming a meniscus. As a result, the part of the lug which is not immersed becomes filled with adhering lead, so that after hardening, the lug takes on the usual rectangular cross-section in the tapered connection zone and in the untapered part.

To produce the same melting and cooling conditions for all plate lugs, DE-OS 36 20 891 suggests that the geometry of the casting molds be changed in such a way that the amount of heat accumulating on each lug (given, in each case, by the volume and the heat capacity of the bridge-forming lead associated with the lug and the surrounding segment of the mold wall) is essentially of the same magnitude. The system is constructed as if it were separated into longitudinal segments (each including one lug) which have the same (or identical) heat content. This condition is met by providing a casting mold in which the lead volume of the bridge is reduced, and the surrounding mold walls are thickened, in proportion to the plate lugs.

However, in battery manufacture, it is common for the positive and negative plates to be constructed so that the plates of one polarity have thicker plates lugs than the plates of the other polarity. However, when fabricated into common plate blocks, for simultaneous connection of the two sets of plates with their lead bridges, only the same casting molds can be used or are available.

SUMMARY OF THE INVENTION

It is therefore the principal object of the present invention to achieve a proper (homogeneous) connection between the pole bridges and the plate lugs for plate blocks having positive and negative plates of different thickness.

This and other objects which will become apparent are achieved in accordance with the present invention by providing plate blocks for lead batteries comprised of a plurality of positive and negative plates having plate lugs which are interconnected by pole bridges cast around the plate lugs in a casting mold (for containing lead for the bridge), wherein the plate lugs of the plates of one polarity are thicker than the plate lugs of the plates of the other polarity, and wherein the thicker plate lugs are tapered in a wedge-like manner along their terminating end segments. To this end, the thicker plate lugs are preferably tapered on both sides, toward their outer end, in such a way that their initially rectangular cross-section is tapered to the shape of a wedge. Conversely, the thinner lugs (of the plates of opposite polarity) remain unchanged. Casting on of the pole bridges is facilitated as a result.

For further detail regarding the manufacture of plate blocks in accordance with the present invention, reference is made to the detailed description which is provided below, taken in conjunction with the following illustrations.

DETAILED DESCRIPTION OF PREFERRED EMBODIMENTS

Figure 1:
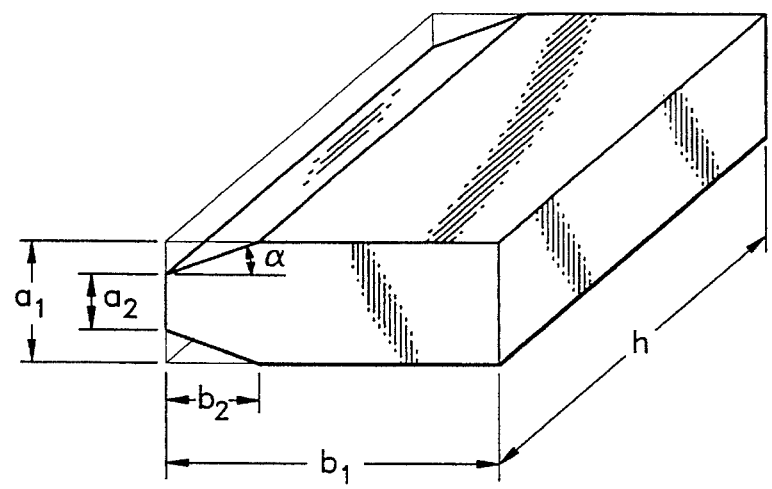
FIG. 1 is an isometric view of a plate lug (of the thicker plates), showing the shaping of the present invention.

In accordance with the present invention, the plates of one polarity will be thicker than the plates of the remaining polarity, and the thicker plate lugs (of the thicker plates of the plate block) are machined with a face milling tool so that each lug acquires a cross-sectional geometry as shown in FIG. 1. The cross-sectional area $A_k$ resulting from this machining is accordingly that of a trapezoid, calculated as:

$$A_{Trapez} = b_2(a_1 + a_2)/2, \tag{1}$$

combined with a rectangular area, calculated as:

$$A_{Rectang} = (b_1 - b_2)a_1, \tag{2}$$

where, $a_1$ is the thickness of the lug, $a_2$ is the final thickness of the tapered segment,
$b_1$ is the length of the lug,
$b_2$ is the length of the tapered lug segment, and
$h$ is the width of the lug.

As an example, the lug thickness $a_1$ is generally in the range between 1.3 mm and 2.5 mm, and the lug length $b_1$ is generally in the range between 15.5 mm and 21 mm. The resulting angle α of the bevel is defined by the opening angle of the face milling tool, and is generally in the range of from 3 to 7 degrees.

For the shorter of the parallel sides of the trapezoid (which are of different lengths), the final thickness of the tapered lug segment is:

$$a_2 = a_1 - 2b_2(\tan \alpha). \tag{3}$$

However, for tool-engineering reasons, $a_2$ should not be below a minimum of 0.5 mm.

Assuming that the corresponding, thinner plate lug (not shown in FIG. 1) has a thickness $a_1'$, where $a_1 > a_1' > a_2$, then its cross-sectional area is given by:

$$A_r = b_1(a_1'). \tag{4}$$

Provided that the lead temperature (of the lead melt for forming the pole bridges) for the two lug geometries is the same, the transferred heat for the thicker plate lugs formed in accordance with the present invention, and for the thinner plate lugs left in their original state (with a continuous rectangular cross-section), will be equal if the cross-sectional areas of the plate lugs are the same. Therefore:

$$A_k = A_{Trapez} + A_{Rectang} = A_r. \tag{5}$$

Because of the equal lug width (h) for the equal cross-sectional areas of the wedge-shaped and rectangular lugs, the volumes of the respective lugs must also be equal so that equal heat transfers will take place.

Figure 2:
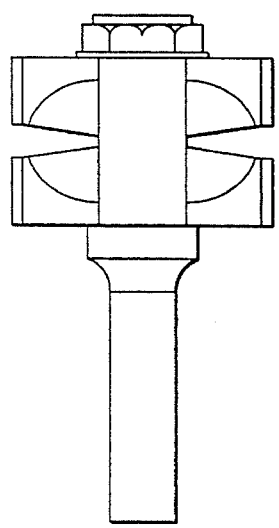
FIG. 2 is an elevational view of a milling tool for shaping the plate lugs.

Providing wedge-shaped, cross-sectionally tapered plate lugs (for the thicker plates) in order to equalize their volume to the thinner plate lugs is advantageously accomplished by using a face milling tool, as shown in FIG. 2. In the embodiment illustrated, the conical geometry of the milling head of the tool is transferred directly to the lugs, as follows.

Figure 3:
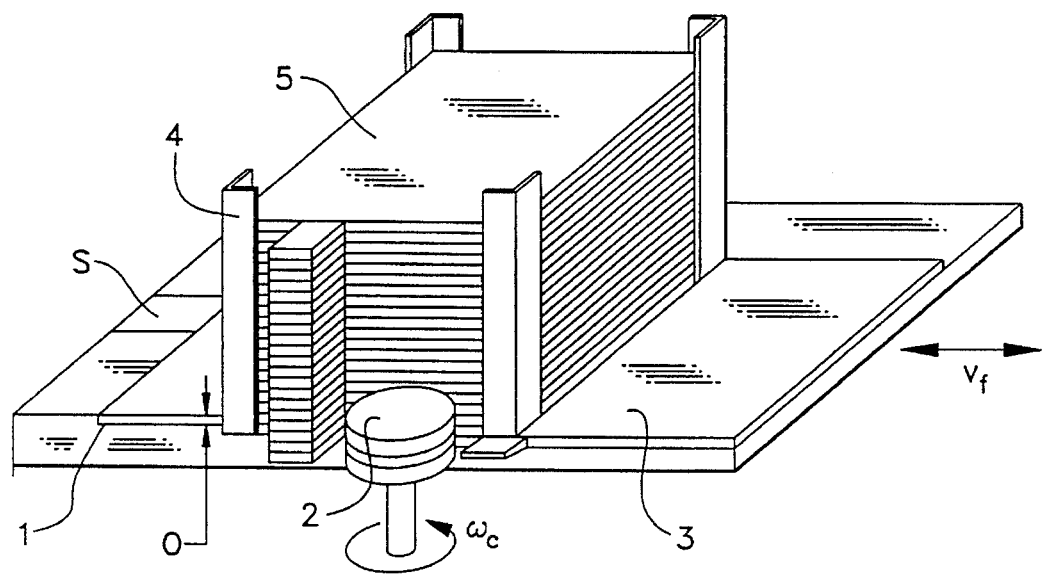
FIG. 3 is an isometric view of an arrangement for machining the plate lugs of FIG. 1 with the milling tool of FIG. 2.

Referring now to FIG. 3, before working, the grid plates are arranged between guide elements 4 to form a stack 5. The guide elements 4 form a boundary for the milling tool 2. A slide valve (S) is provided which reciprocates in the direction of the double-headed arrow $v_f$, causing the horizontal movement of a pusher 1 capable of supporting the stack of plates 5. The slide valve (S) provides an offset (0), with a height which is less than the smallest plate thickness. In this way, as the slide valve (S) causes the pusher 1 to grasp the bottom-most plate 3, for movement to the right, the exposed lug is drawn past the face milling tool 2. During this process, forces produced by the face milling tool 2 on the plate 3 (as it is machined) are preferably absorbed by lateral guides (not shown). As a result, the lug is formed into a wedge shape by the cutting edges of the face milling tool 2. Following this, the worked plate 3 is discharged from the stack 5, and the slide valve (S) returns the pusher 1 to its initial position, allowing the plates remaining in the holder 4 to drop down (in the holder 4) under the weight of the stack which remains.

Due to the wedge-shaped geometry of the present invention, the heat balance of the plate lugs of one polarity is equalized to the heat balance of the plate lugs of the other polarity. In this way, geometrically different lugs can be cast at the same lead temperature without the risk that (in extreme cases) the thicker lugs will be improperly cast on, while the thinner lugs will dissolve in the melt bath. The result is a distinct improvement in the quality of the lug casting process. A special advantage of the milling process of the present invention is that the lugs are cast on with a bare surface, so that the removal of surface oxides with flux, and subsequent removal of the flux (which is rarely completely successful), is omitted.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A plate block for lead batteries comprised of a plurality of positive and negative plates having plate lugs interconnected with pole bridges cast around the lugs in a casting mold, wherein the plate lugs of the plates of a first polarity are thicker than the plate lugs of the plates of a second, opposite polarity, and wherein only the thicker plate lugs terminate in a tapered wedge-shaped segment formed lengthwise along the plate lugs.

2. The plate block of claim 1 wherein the wedge-shaped segment has a cross-sectional area having a trapezoidal shape, with parallel sides of a different length, and wherein a shorter of the parallel sides forms an outer edge of the plate lug.

3. The plate block of claim 2 wherein the thinner plate lugs have a cross-sectional area having a rectangular shape.

4. The plate block of claim 3 wherein the cross-sectional area and volume of the wedge-shaped segment of the thicker plate lugs equals the cross-sectional area and volume of the thinner plate lugs.

5. The plate block of claim 1 wherein the tapered wedge-shaped segment of the thicker plate lugs is produced by machining opposing surfaces of the lugs on both sides, with a face milling tool.

6. A method for preparing plate blocks for lead batteries including a plurality of positive and negative plates having plate lugs for interconnection with pole bridges cast around the lugs in a casting mold, wherein the plate lugs of the plates of a first polarity are thicker than the plate lugs of the plates of a second, opposite polarity, and wherein the method comprises the step of only providing the thicker plate lugs with a termination formed as a tapered wedge-shaped segment, lengthwise along the plate lugs.

7. The method of claim 6 wherein the wedge-shaped segment is formed with a cross-sectional area which is trapezoidal in shape, with parallel sides of a different length, and with a shorter of the parallel sides forming an outer edge of the plate lug.

8. The method of claim 7 wherein the thinner plate lugs are formed with a cross-sectional area having a rectangular shape.

9. The method of claim 8 wherein the cross-sectional area and volume of the wedge-shaped segment of the thicker plate lugs equals the cross-sectional area and volume of the thinner plate lugs.

10. The method of claim 6 which further comprises the step of machining opposing surfaces of the lugs on both sides, forming the tapered wedge-shaped segment of the thicker plate lugs.

11. The method of claim 10 wherein the machining is performed with a face milling tool.

* * * * *